(12) United States Patent
Liden

(10) Patent No.: US 8,600,833 B1
(45) Date of Patent: Dec. 3, 2013

(54) USER INTEREST TAGGING

(75) Inventor: Lars H. Liden, Seattle, WA (US)

(73) Assignee: Amazon Technologies Inc., Reno, NV (US)

( * ) Notice: Subject to any disclaimer, the term of this patent is extended or adjusted under 35 U.S.C. 154(b) by 392 days.

(21) Appl. No.: 12/911,561

(22) Filed: Oct. 25, 2010

(51) Int. Cl.
*G06Q 30/00* (2012.01)

(52) U.S. Cl.
USPC .................. 705/26.7; 705/26.1; 705/26.61

(58) Field of Classification Search
USPC ................................................ 705/26.1–27.2
See application file for complete search history.

(56) References Cited

U.S. PATENT DOCUMENTS

| 2003/0050916 A1* | 3/2003 | Ortega et al. ............ 707/1 |
| 2005/0171832 A1* | 8/2005 | Hull et al. ............ 705/10 |
| 2007/0288433 A1* | 12/2007 | Gupta et al. ............ 707/3 |

OTHER PUBLICATIONS

Dunlap, C. (1996). Online bookstores support electronic commerce. Computer Reseller News, (693), 53.*

* cited by examiner

*Primary Examiner* — Resha Desai
(74) *Attorney, Agent, or Firm* — Lee & Hayes, PLLC

(57) ABSTRACT

Techniques and systems may be used to generate a list of interests of a user that interacts with a catalog of items, such as by purchasing the items from a host. The host may then generate a list of interests of the user using a taxonomy that is mapped to the catalog of items and the user interaction with the items. By generating the list of interests based on user interaction with the catalog, the list of interests may be generated based on factual data rather than user opinion. However, in some instances, the user may additionally provide a self-rating for an interest that is identified by the host. In various aspects, the list of interests may be associated with a reviewer of items of the catalog. In some aspects, a reader may identify reviewers that have similar interests by comparing reviewers' interests to the reader's interests.

28 Claims, 7 Drawing Sheets

USER INTEREST TAGGING

BACKGROUND

People have long been generating self-prescribed listings of personal interests. For example, questionnaires sometimes ask a person to list interests such as types of activities the person likes to perform, types of food the person likes to eat, and so forth. This information may be useful to better understand the person.

Although many people generate accurate listings of their interests, some people may exaggerate or misrepresent their interests by including (or excluding) interests in a list of interests. For example, a person may list hobbies to include rock climbing, surfing, and running, but may in fact only actively participate in surfing and running. The person may also neglect to list another activity (e.g., playing volleyball, etc.) for various possible reasons.

Personal interest information may be helpful in various contexts. Besides advertising and marketing, personal interest information is often used in social networking sites to help describe a person. In addition, match-making sites (e.g., dating sites) may use some personal interest information when determining which people may be compatible across various types of activities and/or interests.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and systems to generate a list of interests of a user that interacts with an electronic catalog of items. In an illustrative process, the user may interact with an electronic marketplace that is provided by a host. For example, the user may purchase (or otherwise acquire) items, view items (e.g., via a browser), inquire about items, write reviews about items, or otherwise interact with items though an interface that allows access by the user to the items in the catalog. The host may then generate a list of interests of the user based at least in part on a taxonomy that is mapped to the catalog of items and at least in part on the user interaction with the items. By generating the list of interests based on user interaction with the catalog, the list of interests may be automatically generated using factual data rather than user opinion. However, in some instances, the user may additionally provide an opinion by providing a self-rating for an interest that is identified by the host.

The lists of interests may be used to better understand the respective user. In some embodiments, the list of interests may be associated with a reviewer of items of the catalog. For example, when a reviewer posts a review of an item, the host may display relevant interests of the reviewer proximate the reviews to enable readers to better understand the interests of the reviewer. In various embodiments, a user (reader) may identify reviewers that have similar interests by comparing reviewers' interests to the user's interests.

As discussed herein, items may include tangible items, digital items, services, media, or anything else a user may consume and/or acquire from a host or any other entity. The user may interact with the host within arm's reach such as at a brick and mortar location and/or by remote interactions such as over the Internet (e.g., via an electronic marketplace) or a telephone.

The techniques and systems described herein may be implemented in a number of ways. Example implementations are provided below with reference to the following figures.

Figure 1:
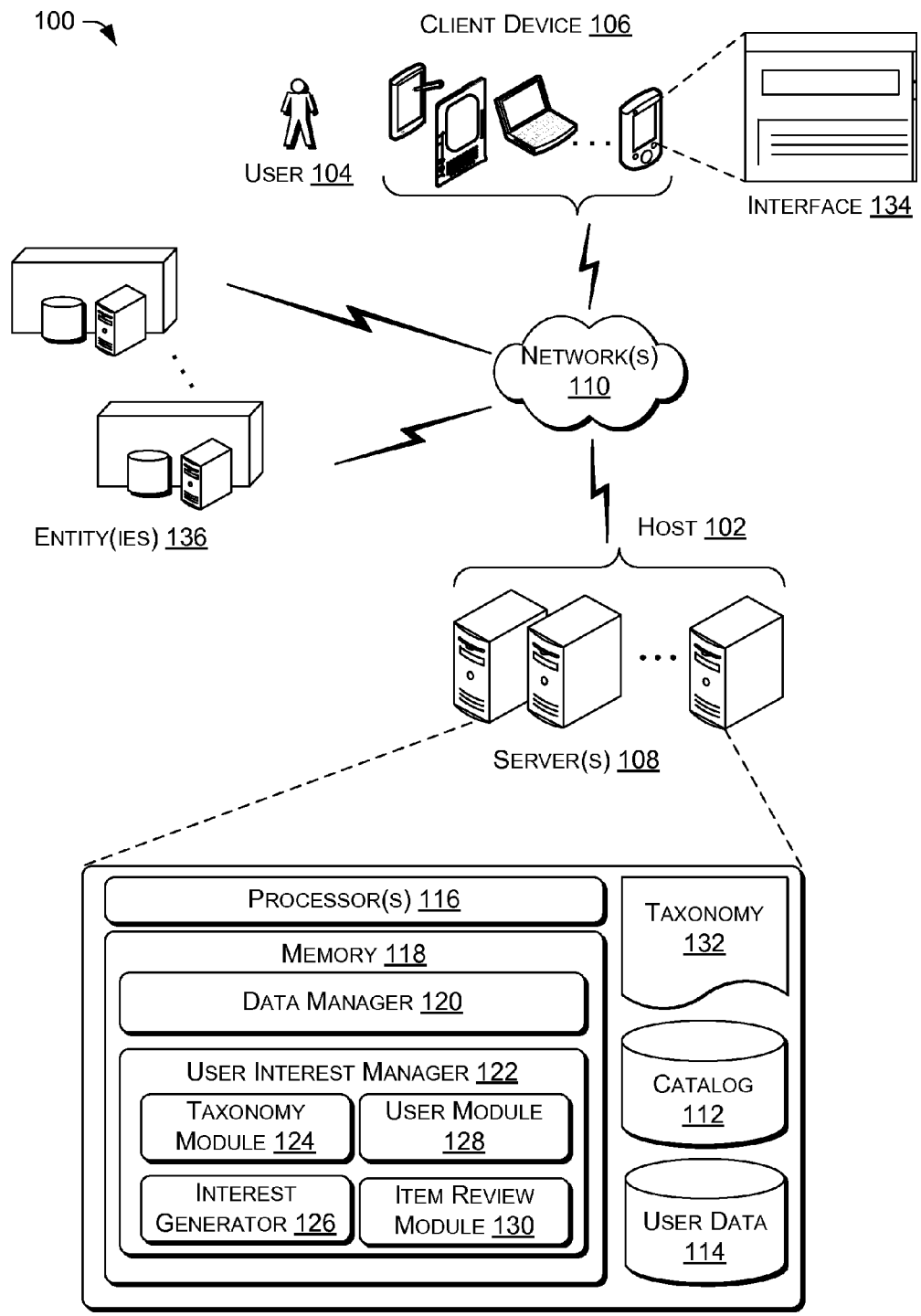
FIG. 1 is a schematic diagram of an illustrative computing environment to provide user interest tagging.

FIG. 1 is a schematic diagram of an illustrative computing environment 100 to provide user interest tagging. The environment 100 includes a host 102 that provides a catalog of items that are made available to a user 104. The host 102 may make the items available for viewing, selection, and/or consumption at a physical location (i.e., brick and mortar), via an electronic marketplace, and/or other locations.

In an electronic marketplace implementation, the user 104 may interact with the host 102 by way of a client device 106 that exchanges data with server(s) 108 via one or more network(s) 110. The network(s) 110 is representative of many different types of networks, such as cable networks, the Internet, local area networks, mobile telephone networks, wide area networks and wireless networks, or a combination of such networks. In FIG. 1, the client device 106 is illustrated as one or more of a wireless telephone, a personal computer, an electronic book reader (eBook reader), and a tablet computer. But, some example implementations include a television set-top box, a game console, a portable digital assistant (PDA), a portable gaming device, a digital video recorder, a portable computer, and other electronic or entertainment devices. Although this disclosure may provide many examples of interactions between the user 104 (via the client device 106) and the host 102 through an electronic marketplace distributed across the network(s) 110, some of these interactions may also be performed through other means (e.g., in person, through an intermediary, etc.) in some implementations.

Regardless of the streams of access and distribution of the items, the host 102 may use server(s) 108 to perform a variety of tasks, such as access a catalog 112 of items and manage user data 114. The host 102 is capable of handling requests from many users and serving, in response, various information and data to associated client devices. The servers 108 may facilitate interaction between the user 104 and user data 114 account by way of the client device 106 in communication with the servers via the network(s) 110. In this manner, the host 102 is may be representative of essentially any site supporting user interaction, including electronic marketplaces, and so forth.

As illustrated, the server(s) 108 are equipped with one or more processor(s) 116 and memory 118. The memory 118 may include applications, modules, and/or data. In some embodiments, the memory 118 may include a data manager 120 to perform ongoing interaction with the user, such as transact items, provide information about the items, or otherwise interact with the user 104. The data manager 120 may generate user data 114 during interaction with the user 104 such as to store purchase information, browsing history, and other user interactions with the host 102 that involve items from the catalog 112. For example, when the user 104 interacts with the host 102 in a physical location, the host 102 may link information about the user to a respective user account using information from the user such as the user's name, payment information (credit card number, etc.), a driver license number, and/or other user information. When the user 104 interacts with the host 102 from a remote location, the host may link information about the user to a username, personal identification number (PIN), account number, and so forth.

In various embodiments, the memory 118 may also include a user interest manager 122 to generate a list of interests of the user 104. The user interest manager 122 may include various modules such as a taxonomy module 124, an interest generator 126, a user module 128, and an item review module 130, among other possible modules that enable generation of the list of interests and other related features.

The taxonomy module 124 may enable mapping a taxonomy 132 (or multiple taxonomies) to the catalog 112. The taxonomy 132 may include assignments of items in the catalog 112 to predetermined interests. The interests may include events, types of items, genres, user likes/dislikes, personal traits, or any other information that describes the user. In some instances, the taxonomy 132 may map to various nodes within the catalog 112, such as categories of items, specific items, or other classifications stored within the catalog 112.

The interest generator 126 may use the taxonomy 132, once implemented with the catalog 112, to generate interests for the user 104. The interest generator 126 may associate the user data 114 to the taxonomy 132 by way of the catalog 112 to identify interests of the user. For example, the user 104 may interact with the host 102 via an interface 134 accessible via the client device 106. The user 104 may have conducted various activates with the host 102, such as purchased a pair of ice skates, downloaded an electronic book (eBook) on ice skating, and watched a movie about ice skating that was distributed to the user 104 by the host 102. Each of these items may be stored in the catalog 112 while the interaction with these items may be stored in the user data 114 as records. The taxonomy 132 may link these items to one or more interests, such as "ice skating." Thus, a user that interacts with some or all of these items may similarly be assigned an interest in ice skating. In some embodiments, the interest generator 126 may also create ratings for each interest and/or may employ normalization techniques to identify and rate the interests, among other possible calculations.

The user module 128 may enable the user 104 to review and manage the user's interests that are generated by the interest generator 126. In some instances, the user 104 may access an interface that allows the user to provide self-ratings that may be displayed with the ratings generated by the interest generator 126. The user module 128 may also enable the user 104 to control distribution of the interest information.

The item review module 130 may use the interest information to enhance reviews of items that are available by the host via the catalog 112. For example, the item review module 130 may post a reviewer's interests with a review authored by the reviewer to enable a reader to better understand the reviewer.

In some embodiments, the user interest manager 122 may provide some of the user interest information to entities 136, such as after the user 104 authorizes distribution of the interest information via the user module 128. The interest information may be used to improve marketing and/or advertising directed to the user 104. In some instances, the interest information may be made available for publication by the host 102 and/or the entities 136 (e.g., social networking sites, matchmaking sites, etc.) upon authorization by the user 104.

Illustrative Operation

Figure 2:
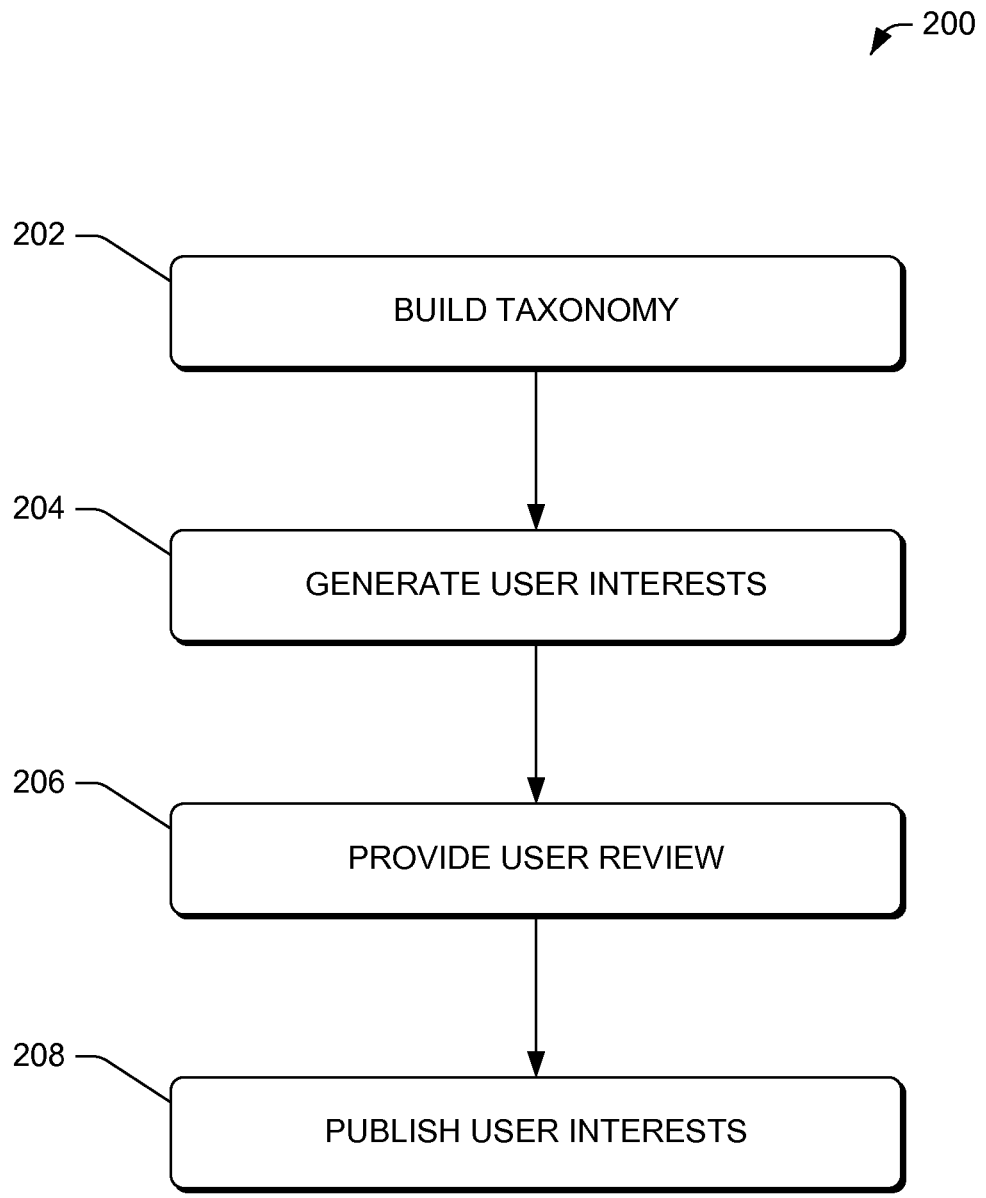
FIG. 2 is a flow diagram of an illustrative process to generate a list of user interests.

FIG. 2 is a flow diagram of an illustrative process 200 to generate a list of user interests. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly. The process 200 is described with reference to the environment 100 shown in FIG. 1.

At 202, the taxonomy module 124 may be used to build the taxonomy 132 and integrate the taxonomy (or taxonomies) with the catalog 112. In some embodiments, the taxonomy 132 may be self-sustainable once it is implemented with the catalog 112. However, in some embodiments, the taxonomy module 124 may have to perform periodic or randomly scheduled maintenance on a mapping of the taxonomy 132 to the catalog 112, such as when the catalog is expanded to add new categories, the taxonomy is revised to include new interests, or for other reasons. The taxonomy 132 may be generated by the host 102 or by another entity, such as one of the entities 136 and distributed to the host 102 for integration with the catalog 112.

At 204, the interest generator 126 may generate user interests by mapping user transactions stored in a user account with the taxonomy 132 via the catalog 112. In some embodiments, the interest generator 126 may generate a score for each interest. In various embodiments, the score may undergo a normalization adjustment based on various factors such as historical frequency of purchase of a particular item, average purchase frequency by other users, total purchases, last purchase, or other relevant factors. When the score reaches or exceeds a threshold value, the interest may be associated with the user. In some embodiments, each interest may further include an interest rating to show a range within the interest. For example, the rating may be a scale (e.g., 1-10, etc.), depicted via a bar graph, colors, font size, key words (e.g., low, medium, high, casual, enthusiast, etc.), and so forth. The user transactions may include user activity such as the user acquiring items, viewing items, inquiring about an item, writing a review about an item, or otherwise interacting with items though an interface that allows access by the user to the items in the catalog. Each type of user transaction may be assigned a weight, which may be used to calculate the score. In some embodiments, the weight may be a value between zero (0) and one (1), where a weight of zero effectively does not contribute to the score of an item.

At 206, the user module 128 may enable the user 104 to review a list of interests that is generated for the user by the interest generator 126. In some embodiments, the user module 128 may enable the user to add a self-rating (user rating) and/or manipulate options such as without limitation to limit publication or otherwise control use and/or output of the list of interests. The user module 128 may restrict the user from adjusting a rating generated from the operation 204, but instead may enable the user to add a user rating along with the rating generated from the operation 204.

At 208, the user interest manager 122 may publish the list of interests for a user. The publication may be a presentation to the user 104 and/or other users via the host 102 (after authorization by the user 104). In some embodiments, the list of interests may be selectively used for marketing items to the user 104, such as via an advertisement. The list of interests may also be associated with the user to help match the user with similar users. In some embodiments, the list of interests may be published by the item review module 130 to enable a user to view a reviewer's interests, sort reviews by respective reviewer's interests, and perform other actions based on the reviewer's interests.

Figure 3:
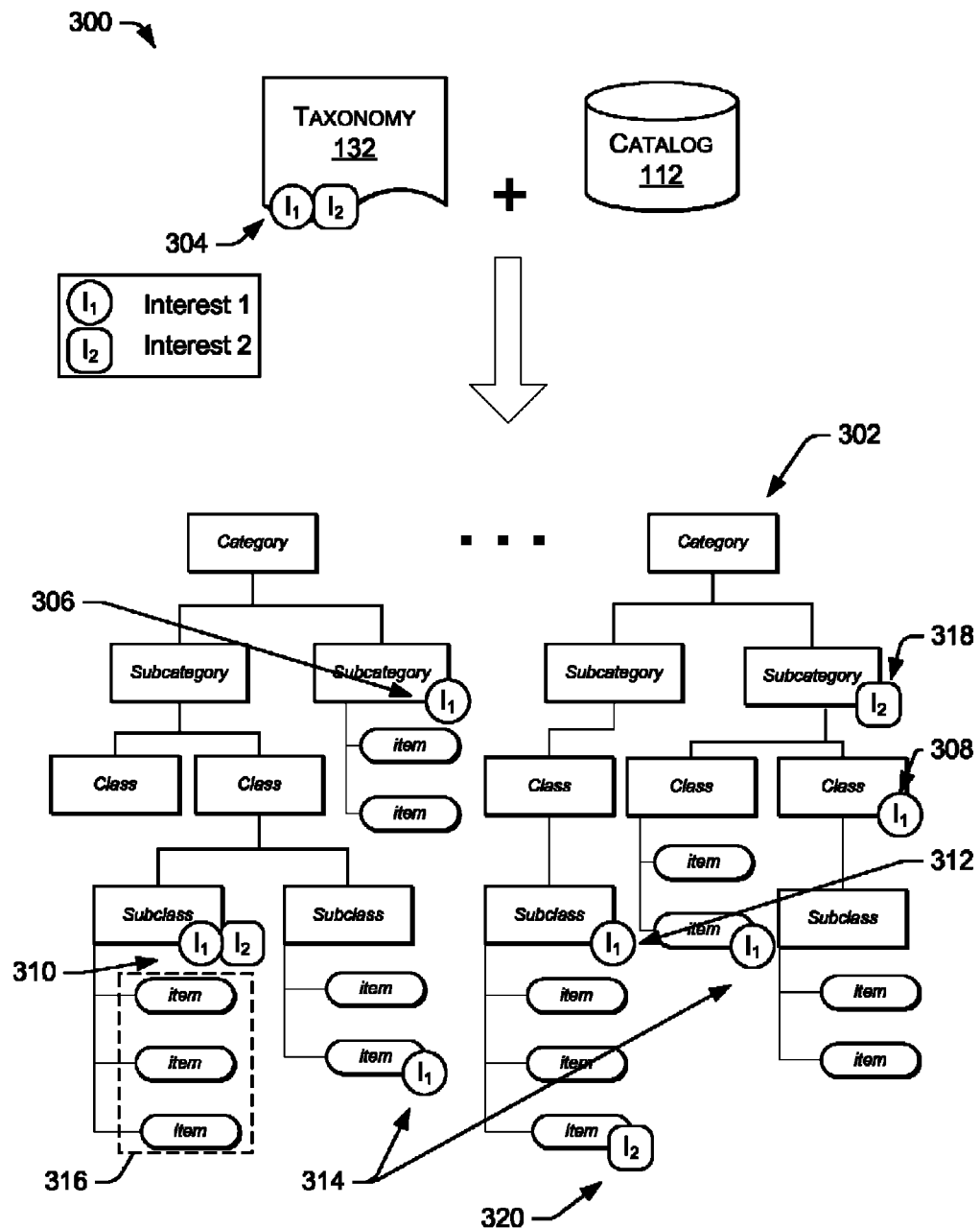
FIG. 3 is a schematic diagram of an illustrative map that implements interest taxonomy data with a catalog of items.

FIG. 3 is a schematic diagram of an illustrative map 300 that implements the taxonomy 132 with the catalog 112 of items. In accordance with some embodiments, various nodes 302 within the catalog 112 may be mapped to interests 304 in the taxonomy 132. The nodes 302 may be any point (grouping of items) along a hierarchy (or other arrangement) of the catalog 112, such as categorization of items by category, subcategory, class, subclass, generic item, specific item, and so forth.

The map 300 shows the interests 304 that are assigned to various instances of the nodes 302. For illustrative purposes, the interests 304 are represented by a first interest $I_1$ and a second interest $I_2$; however, more interests may be included in the taxonomy 132. For example, the first interest $I_1$ may be assigned to a subcategory 306, a class 308, a subclass 310, another subclass 312, and various items 314. When a grouping of items (e.g., class, subclass, etc.) is associated with an interest, then all items included under the respective grouping are associated with the interest. Thus, as shown in FIG. 3, the grouping of items 316 is associated with the first interest $I_1$ because the subclass 310 includes the first interest $I_1$.

In some embodiments, a grouping of items or items may be assigned to multiple interests. As shown in FIG. 3, the second interest $I_2$ is also assigned to the subclass 310. In addition, the second interest $I_2$ is assigned to the subcategory 318 and the item 320, which also include duplication of some groupings of items that are assigned to the first interest $I_1$, such as the class 308 and items 314.

In accordance with one or more embodiments, the multiple taxonomies may be concurrently mapped to the catalog 112. In some instances, the taxonomy 132 may be generated at a granular (detailed) level to enable building up other taxonomies based on the granular taxonomy. For example, the granular taxonomy may include many different interests while higher level taxonomies may be generated by combining some of the interests in the granular taxonomy, which may result in fewer numbers of interests. A non-exhaustive list of interests may include music, movies, sports, activities, hobbies, travel destinations, purchase type (e.g., early adopter, thrifty shopper, etc.), and so forth. In some instances, the taxonomy 132 may link the nodes 302 to more abstract interests, such as interests that may be used to match people on a dating site. As discussed above, multiple taxonomies may be integrated in the catalog 112. Possible types of taxonomies include marketing (advertising) interest taxonomies, social networking taxonomies, item reviewer taxonomies, matchmaking taxonomies, and so forth.

Figure 4:
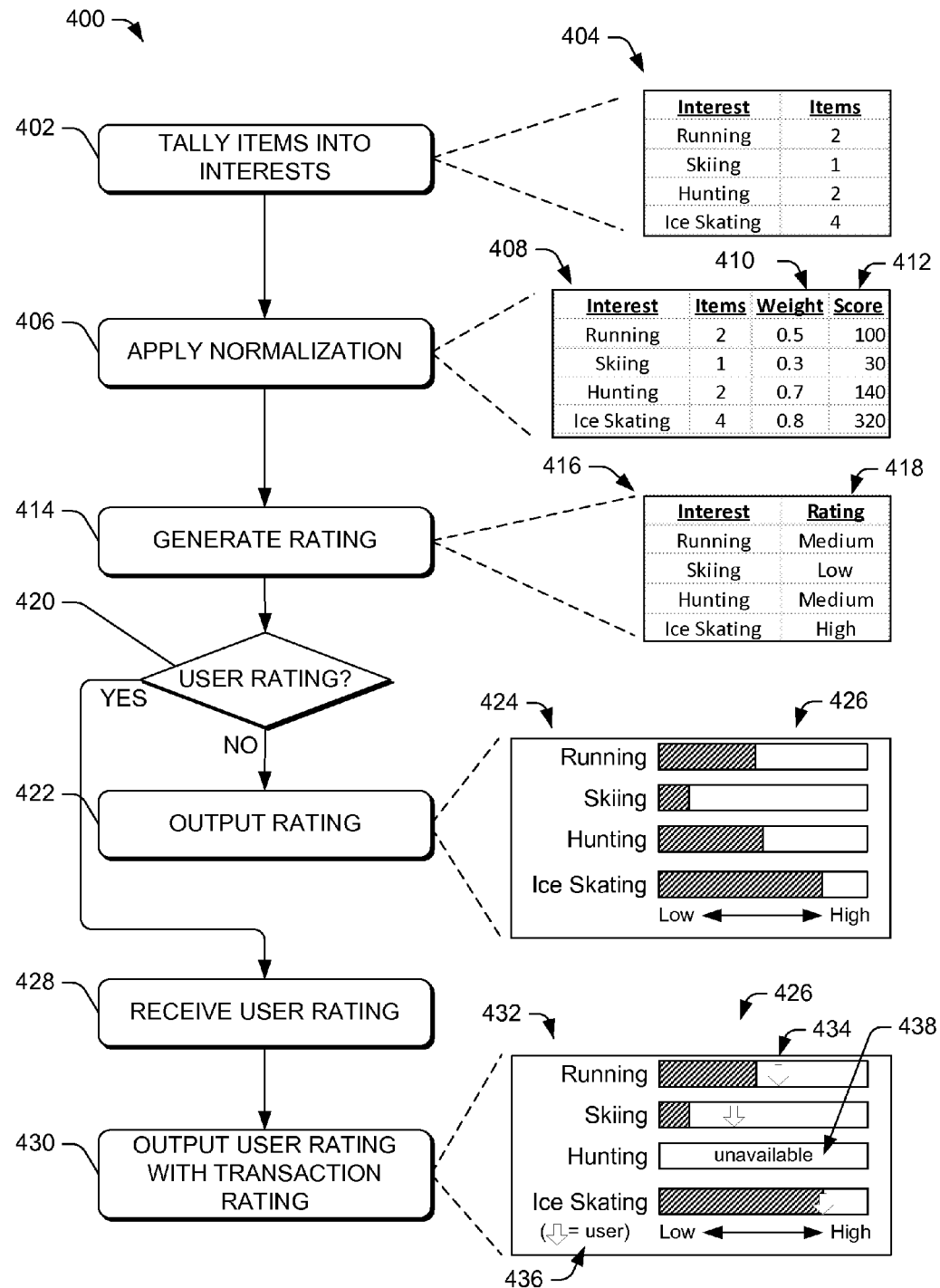
FIG. 4 is a pictorial flow diagram of an illustrative process to generate a list of user interests that may include a self-rating by the user.

FIG. 4 is a pictorial flow diagram of an illustrative process 400 to generate a list of user interests that may include a self-rating by the user. The order in which the operations are described is not intended to be construed as a limitation, and any number of the described blocks can be combined in any order and/or in parallel to implement the process 400. The process 400 is described with reference to the environment 100 shown in FIG. 1.

At 402, the interest generator 126 may aggregate quantities of items for each interest from the various nodes 302 for one or more taxonomy. For example, items associated with the interest "running" may be located in two different locations (different browse nodes) in the catalog 112, such as under fitness training books and under athletic shoes based on records in the user transaction history (user data 114). An aggregate total 404 may show item quantities for interests in a selected taxonomy. Items that are returned or purchased as gifts may be excluded from the quantity of items for the user 104 in the aggregate total 404.

At 406, the interest generator 126 may apply a normalization factor for each interest to create item scores. A normalization chart 408 shows a weight 410 that is used in the normalization to generate a score 412 for each interest. In some embodiments the weight 410 may be representative of the normalization factors and may be multiplied by the quantity of items to generate the score 412 (e.g., $2 \times 0.5 \times 100 = 100$). Possible normalization factors may include historical frequency of purchase (recent or old, relative to product type, etc.). For example, a higher score may be assigned to a purchase of a pair of skis than a shirt because skis are typically purchased less frequently than shirts. Other factors may include price, relation to overall purchases, and other possible factors. In some instances, consumable goods may be disregarded or weighed less than durable goods. A type of user interaction may also influence the weight. For example, a purchase may generate a higher value for the weight than a product view or a question about the item. Purchase across various categories (different nodes) may also increase the weight. Thus, two items purchased from the category athletic shoes may have a lower weight (and score) than two items of the same interest that are purchased from different categories (e.g., athletic shoes and fitness training books).

At 414, the interest generator 126 may generate a rating for each interest based at least in part on the score 412 of each interest. A ratings summary 416 may include ratings 418, which may be a numerical score, a representative grouping (e.g., low, medium, high, etc.), and so forth. The ratings 418 may indicate a relative level of the interest, such as an enthusiast versus a casual interest. In some instances, items having the score 412 below a threshold may not include the rating, or may be assigned a lower rating (e.g., low, infrequent, very casual, etc.) and may be ultimately excluded from a listing of the interests. For example, in the rating summary 416, the interest "skiing" may be excluded as an interest because of a lower rating.

At 420, the user interest manager 122 may determine whether to enable user ratings via the user module 128. When the user rating are not enabled (or otherwise excluded), then at 422 the user interest manager 122 may output an interest summary 424. The interest summary 424 may include the interests for the user 104, and in some instances, a transaction rating 426 for each interest. The transaction rating 426 may be shown as a numeric value, a word, and/or a graphic (as shown in FIG. 4).

When the user interest manager 122 enables user ratings at 420, then the user module 128 may process the user ratings at 428. For example, the user 104 may input a value representative of the user's opinion of his/her interest level for a particular interest. Further details about the user ratings are discussed below with reference to FIG. 8.

At 430, the user interest manager 122 may output an enhanced interest summary 432 that includes a user rating 434 with the transaction rating 426. User rating 434 may be distinguishable from the transaction rating 426 to enable another user (or reader) to distinguish between the different types ratings. For example, the user rating for an interest "running" may be higher than a transaction rating for that interest for various reasons, such as the user purchases items related to running from other sources, has recently become interested in running, or for other reasons. A key 436 may be included to define the various ratings. In some embodiments, some data may be hidden by the user, the host 102, and/or another entity. For example, the rating for "hunting" is marked as "unavailable" at 438. In various embodiments, the user 104 may use the user module 128 to selectively hide some or all of the user's interests from view by other users, the entities 136, and/or the host 102.

Illustrative User Interfaces

Figure 5:
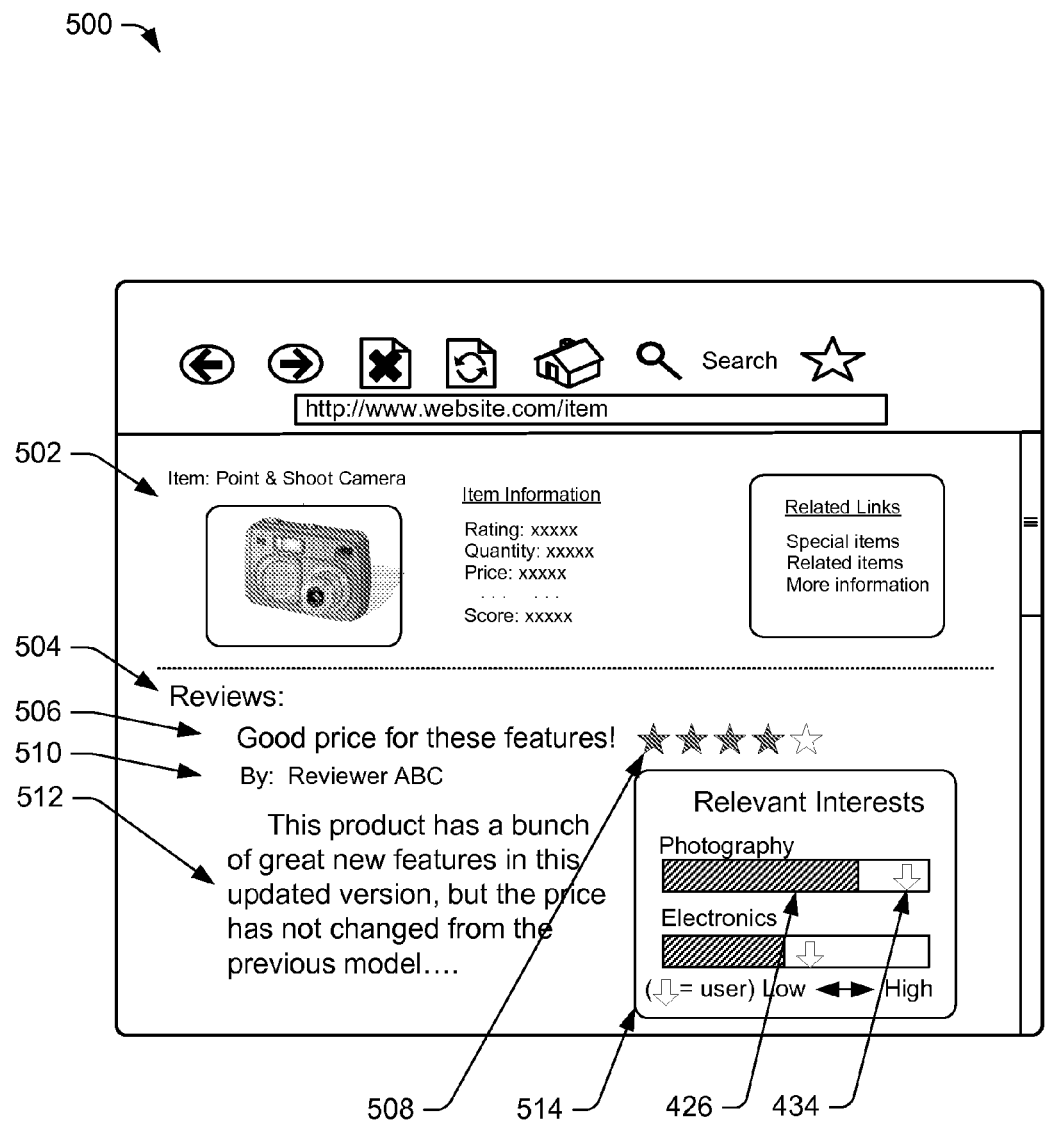
FIG. 5 is an illustrative user interface (UI) that provides a review of an item by a reviewer and interests of the reviewer.

FIG. 5 is an illustrative user interface (UI) 500 that provides a review of an item by a reviewer and associated interests of the reviewer. The UI provides an example of one possible use of the interest information generated by the process 200 and/or the process 400 described above.

In various embodiments, the UI 500 may include an item section 502 to enable a user (reader) to learn about an item or otherwise view information about the item. The UI 500 may also include a review section 504. Each review may include a title 506, a rating 508, a reviewer 510, a review (or portion thereof) 512 authored by the reviewer, and a related interests section 514. The related interests section 514 may inform the reader about the interests of a reviewer. The related interests section 514 may include interests that are relevant to the item section 502. For example, when the item is a camera, the relevant interest may include "photography" and "electronics," among other possible interests. The ratings may include the transaction ratings 426 and/or the user ratings 434. In some embodiments, the relevant interests may be interests that are mapped to the particular item in the item section 502. For example, the item "camera" may be identified with both the interest "photography" and "electronics" via the taxonomy 132 when mapped to the catalog 112. In various embodiments, the related interests may be used to sort the reviewers, such as to sort the reviewers (and corresponding reviews) having the highest interest of "photography" or another related interest.

Figure 6:
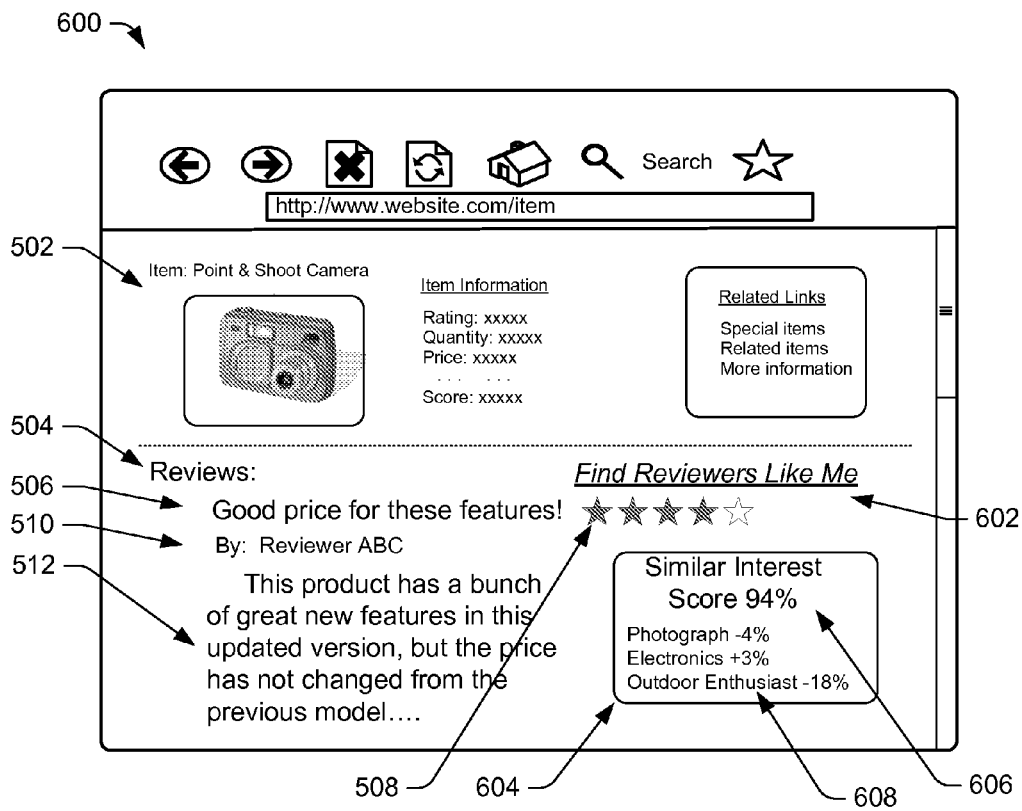
FIG. 6 is an illustrative UI that provides a similarity score of a reviewer based on known interests of the reviewer and a reader.

FIG. 6 is an illustrative UI 600 that provides a similarity score of a reviewer based on known interests of the reviewer and a reader (e.g., the user 104). The UI 600 may include a similarity selector 602 to enable a reader to locate a reviewer that is similar to the reader when the reader includes a user account that stores interests of the reader in accordance with the process 200. When the reader selects the similarity selector, the review section 504 may be resorted or may otherwise present reviews based at least in part on the similarity between the interests of the reviewers and the interests of the reader. Similarity may be based on all interests of the reader or a subset of the interests, such as interests that are related to an item or service viewed by the reader.

In some embodiments, the review section 504 may include a similar interest section 604. The similar interest section 604 may include a similar interest score 606 that may be representative of a similarity of interests between the reader and the reviewer 510. In some embodiments, the similarity score may be generated using a vector distance calculation based on all interests of the reader or a subset of the interests, such as the interests that are related to the item or service viewed by the reader. The similar interest section 604 may also include a sample 608 of some related interests with a deviation from the reader's interest versus the reviewer's interest. For example, the sample 608 may include "photograph −4%" when the reviewer's interest is less than the reader's interest for this category.

Figure 7:
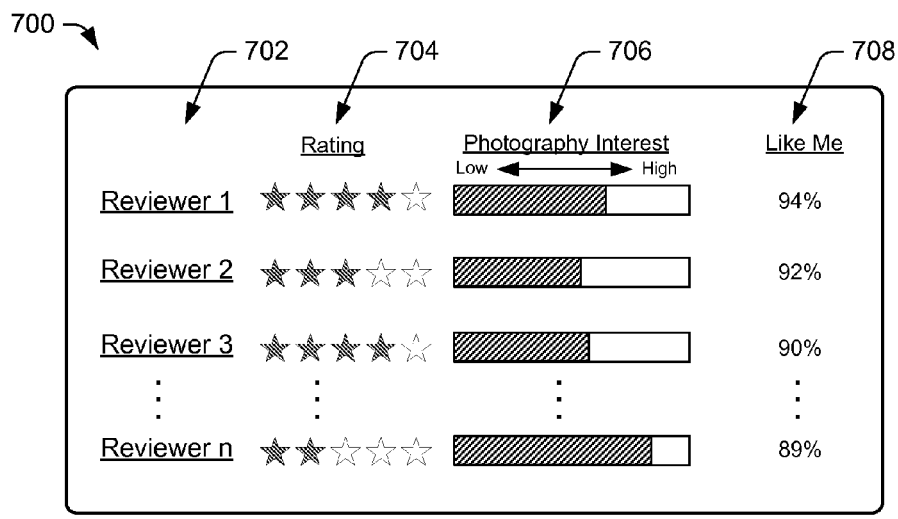
FIG. 7 is another illustrative UI that provides a comparison between reviewers based on known interests of a reader.

FIG. 7 is another illustrative UI 700 that provides a comparison between reviewers based on known interests of a reader. The UI 700 may be implemented with the UI 600 or separately to enable the reader (e.g., the user 104) to identify and compare reviewers based at least in part on a similarity of interests between the reader and the reviewers.

The UI 700 may include a listing of reviewers 702 and associated ratings 704, similarity interest 706, and similarity score 708. The similarity interest may be for a specific interest category, such as "photography" when the item section 502 includes a camera. The similarity score 708 may include a score representative of a combination of interests of each reviewer compared to the reader. Thus, a higher score indicates a more similar set of interests between the reader and a particular one of the reviewers 702.

Figure 8:
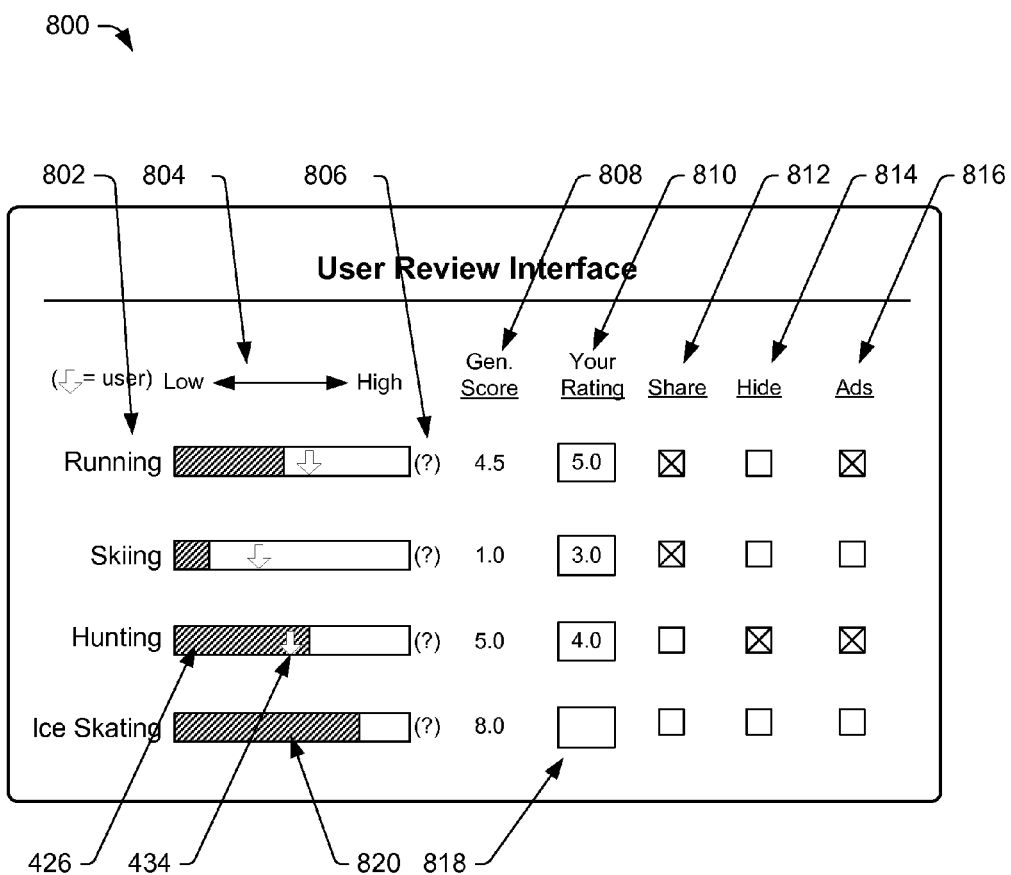
FIG. 8 is yet another illustrative UI that provides an output of the list of interests for review by the user and user-selectable options for each of the interests.

FIG. 8 is an illustrative UI 800 that provides an output of the list of interests for review by the user and user-selectable options for each of the interests. The UI 800 may be used to enable the user 104 to input data to the user module 128, and thereby allocate use of the interest data, set a self-rating, and perform other tasks.

The UI 800 may include a list of interests 802. The list of interests 802 may include interests that are identified for the user or more or less interests (all interests or a portion thereof). Each of the interests may include a rating 804, which may be output as a graphic, numerical data, textual data, or a combination thereof. The rating 804 may include the transaction rating and/or the user rating.

In some embodiments, each of the interests in the list of interests 802 may include an inquiry selector 806 to enable the user to gain additional information about an interest. For example, in some instances, a selection of the inquiry selector 804 may provide the user with a report that identifies items, actions, or other reasons for the transaction rating 426 for the respective rating. In some instances, a report may be high level or generic description of the interest and various attributes indicative of the interest while other instances of the report may indicate the taxonomy behind the interest.

In various embodiments, the UI 800 may include a generated score 810, which may represent a numerical value for the transaction rating 426. A self-rating input 810 may be input by the user 104 to add the user rating 434. Thus, when the user 104 enters a value into the self-rating, the UI 800 may be refreshed to show the user rating 434 along with the transaction rating 426.

The UI 800 may also include management selectors that include a share selector 812, a hide selector 814, and an advertising (i.e., marketing) selector 816 to enable the user 104 to manage display, use, and/or publish the user's interest information. The share selector 812 may enable other uses to view the user's interest, such as via the related interests section 514 shown in FIG. 5. The hide selector 814 may make the interest rating unavailable to other users, such as shown at 438 in FIG. 4 where the interest "hunting" is marked as "unavailable." The marketing selector 516 may enable the user to selectively use the interest for marketing information, which may enable advertisers to transmit advertising or other marketing information to the user based at least in part on the interests.

In accordance with embodiments, the user 104 may leave some or all of the selectors blank, null, or undefined, and thereby still provide some information based on the user's interests as shown at 818 where the transaction rating for "ice skating" is output at 820 without the user rating 434.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   mapping, by one or more processors, a taxonomy of interests to a catalog of items made available for consumption by a plurality of users of an electronic marketplace;
   retrieving, for individual users of the plurality of users, one or more transaction records resulting from interaction with one or more items in the catalog;
   generating a list of interests for the individual users of the plurality of users by determining taxonomy interests that are associated with the one or more items from the transaction records;
   receiving, from a user, a request to present information about an item of the one or more items in the catalog;
   comparing the list of interests for the user that provides the request to individual lists of interests for one or more of the plurality of users that have provided a review of the item;
   identifying, based on the comparing, at least one user of the plurality of users that has interests similar to the interest of the user that provides the request to present the information about the item; and
   presenting the review of the item provided by the at least one user with an indication of at least one similar interest.

2. The method as recited in claim 1, wherein the one or more transaction records are generated in response to one of the plurality of users acquiring the one or more items from the catalog.

3. The method as recited in claim 1, wherein the catalog includes a hierarchical structure of the items arranged under nodes within the catalog, and wherein the mapping the taxonomy includes mapping the taxonomy interests to the nodes.

4. The method as recited in claim 1, wherein the generating the list of interests for the individual users of the plurality of users includes generating a rating for individual interests that indicates a relative level of interest.

5. The method as recited in claim 4, wherein the rating is based on the one or more transaction records, the method further comprising:
   receiving a user rating from the individual user for at least one of the interests in the list of interests; and
   outputting the at least one of the interests with the user rating.

6. A method, comprising:
   obtaining transaction records associated with a user, the transaction records resulting from interaction by the user with items in a catalog;
   generating, by one or more processors, user interests for the user based on a taxonomy associated with the items in the catalog and the transaction records associated with the user;
   receiving a review of an item, the review being authored by the user;
   receiving a request to present information about the item;
   presenting the information about the item and a selector that in response to activation causes one or more reviewers to be located, wherein the one or more reviewers have interests similar to interests of a reader that activates the selector and wherein the one or more reviewers include the user that authored the review of the item; and
   presenting the review of the item authored by the user with an indication of at least one user interest from the user interests, the at least one user interest being associated with the item subject to the review and being similar to the interests of the reader.

7. The method as recited in claim 6, wherein the generating the user interests for the user includes generating a rating for individual user interests based at least in part on the transaction records.

8. The method as recited in claim 7, wherein the rating comprises one of a high rating or a low rating, the high rating indicating a relatively high interest of the user in a category of items and the low rating indicating a relatively low interest of the user in the category of items.

9. The method as recited in claim 7, further comprising presenting the user interests to the user to enable the user to provide a user rating for individual user interests.

10. The method as recited in claim 7, further comprising causing a rendering of at least a portion of the user interests and the respective ratings for the portion of the user interests.

11. The method as recited in claim 10, wherein the respective ratings are rendered as at least one of text or an image to indicate a high level of interest or a low level of interest.

12. The method as recited in claim 7, wherein the rating for an individual user interest is based in part on a percentage of items purchased by the user that map to the individual user interest.

13. The method as recited in claim 7, wherein the rating for an individual user interest is based at least in part on a historical frequency of purchase for a respective item.

14. The method as recited in claim 6, further comprising providing user options that control output of the user interests, the user options including at least one of an option to share individual user interests with readers of the review, an option to hide individual user interests from the readers of the review, or an option to provide marketing to the user based on individual user interests.

15. The method as recited in claim 6, wherein at least a portion of the transaction records comprise data storing user purchases of one or more of the items in the catalog.

16. The method as recited in claim 6, wherein the catalog includes a hierarchical structure of items arranged under nodes within the catalog, and further comprising building the taxonomy by mapping taxonomy interests to the nodes.

17. The method as recited in claim 6, further comprising transmitting the user interests to a third party after receiving authorization from the user, the third party being at least one of a host of a social networking site, a host of a match-making site, or an advertiser.

18. The method as recited in claim 6, further comprising:
   comparing the interests of the reader to the user interests of the user that authored the review of the item; and generating, based on the comparing, one or more similarity scores indicating a common interest between the reader and the user.

19. The method as recited in claim 18, wherein the generating the one or more similarity scores is based at least in part on shared interests related to the item subject to the review.

20. The method as recited in claim 6, wherein the indication of at least one interest includes a user rating based at least in part on input from the user.

21. A method, comprising:
   obtaining transaction records associated with a user, the transaction records resulting from interaction by the user with items in a catalog;
   generating, by one or more processors, user interests for the user based on a taxonomy associated with the items in the catalog and the transaction records associated with the user;
   receiving a review of an item from the user;
   comparing the user interests with reader interests of a reader;
   generating, based on the comparing, one or more scores indicating similar interests between the user and the reader;
   selecting, based on the one or more scores, the review of the item from the user as one or more reviews to provide to the reader; and
   presenting the review of the item from the user and information associated with the one or more scores indicating the similar interests between the user and the reader.

22. The method as recited in claim 21, further comprising:
   presenting item information associated with the item; and
   posting a selector option that, in response to activation, identifies the user as a reviewer with similar interests to the reader interests.

23. The method as recited in claim 22, further comprising presenting the review of the item from the user and the information associated with the one or more scores indicating the similar interests between the user and the reader in response to selection of the selector option by the reader of the review.

24. The method as recited in claim 22, further comprising presenting the one or more scores in response to selection of the selector option by the reader of the review.

25. The method as recited in claim 21, wherein the generating the user interests for the user includes generating a rating for individual user interests based at least in part on the transaction records.

26. The method as recited in claim 25, wherein the rating comprises one of a high rating or a low rating, the high rating indicating a relatively high interest of the user in a category of items and the low rating indicating a relatively low interest of the user in the category of items.

27. The method as recited in claim 25, wherein the rating for an individual user interest is based in part on a percentage of items purchased by the user that map to the individual user interest.

28. The method as recited in claim 21, wherein the catalog includes a hierarchical structure of items arranged under nodes within the catalog, and further comprising building the taxonomy by mapping taxonomy interests to the nodes.

* * * * *